United States Patent
Hanko et al.

(10) Patent No.: US 6,915,347 B2
(45) Date of Patent: Jul. 5, 2005

(54) ASSOCIATING MULTIPLE DISPLAY UNITS IN A GROUPED SERVER ENVIRONMENT

(75) Inventors: James G. Hanko, Redwood City, CA (US); Sangeeta Varma, Sunnyvale, CA (US); J. Kent Peacock, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 744 days.

(21) Appl. No.: 09/733,579

(22) Filed: Dec. 6, 2000

(65) Prior Publication Data

US 2002/0046300 A1 Apr. 18, 2002

Related U.S. Application Data

(60) Provisional application No. 60/241,292, filed on Oct. 17, 2000.

(51) Int. Cl.[7] ............................................. G06F 15/16
(52) U.S. Cl. ...................... 709/227; 709/203; 709/248
(58) Field of Search ................................ 709/203, 248, 709/227, 223, 228, 239, 200, 213, 224; 345/759; 707/2; 719/329

(56) References Cited

U.S. PATENT DOCUMENTS

| | | | | | |
|---|---|---|---|---|---|
| 5,313,581 A | * | 5/1994 | Giokas et al. | ............... | 719/329 |
| 5,392,400 A | * | 2/1995 | Berkowitz et al. | ........... | 709/203 |
| 5,408,600 A | * | 4/1995 | Garfinkel et al. | ............ | 345/759 |
| 5,685,775 A | * | 11/1997 | Bakoglu et al. | ............... | 463/41 |
| 5,748,189 A | * | 5/1998 | Trueblood | .................... | 345/755 |
| 6,269,402 B1 | * | 7/2001 | Lin et al. | ..................... | 709/227 |
| 6,289,333 B1 | * | 9/2001 | Jawahar et al. | ................ | 707/2 |
| 6,662,224 B1 | * | 12/2003 | Angwin et al. | ............. | 709/224 |
| 6,826,613 B1 | * | 11/2004 | Wang et al. | ................ | 709/227 |

FOREIGN PATENT DOCUMENTS

EP          0927609          6/1999

* cited by examiner

*Primary Examiner*—Hosain Alam
*Assistant Examiner*—Ben Bruckart
(74) *Attorney, Agent, or Firm*—Martine Penilla & Gencarella LLP

(57) ABSTRACT

A method for grouping Human Interface Devices (HIDs) into a multi-head display is provided. The HIDs are identified as either "primary" or "secondaries". A computational-service policy module is consulted when a new HID connects to the network. If the HID is identified as a secondary, the module consults all servers within a group to see if the primary presently has an active session connected to any of the servers. If the primary is being controlled by the same server to which the secondary is connected, the session connection information for the primary is augmented to indicate that the secondary is attached to the same session, and this information is disseminated to the interested software entities. The associated session may then provide multi-head outout to the secondary. If the primary is being controlled by another server in the group, the secondary re-attaches to the server that is hosting the primary.

18 Claims, 12 Drawing Sheets

ASSOCIATING MULTIPLE DISPLAY UNITS IN A GROUPED SERVER ENVIRONMENT

CROSS-REFERENCE TO RELATED APPLICATIONS

This application claims the benefit of U.S. Provisional Application No. 60/241,292, filed Oct. 17, 2000.

BACKGROUND OF THE INVENTION

1. Field of the Invention

The present invention relates to associating multiple display units in a grouped server environment.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

When computing, a user often has many computer programs running at the same time. Sometimes, the user wants to switch back and forth between the computer programs. At times, however, the number of running computer programs may become so large that the physical size of the output device will be too small to effectively show the user all of the running computer programs. This makes it difficult for the user to switch between the computer programs.

One solution to this problem is to take multiple output devices, arrange them in a logical order, and display output on all of the devices. For instance, three output devices could be aligned in a row to essentially create one output screen three times larger in size. Such an arrangement is termed a "multi-head" configuration. Multi-head configurations, however, are difficult to create on modern computers. Before further discussing the difficulties associated with creating a multi-head configuration, modern computing is discussed below.

Modern Computing

In modern computing it is desirable for a user to be interacting with a computing device in a first location, to stop the interacting with the device, to move to a new location, and to begin interacting at the new location at precisely the point where the user stopped interacting at the first location. One type of computation architecture that allows for this type of interaction involves simple, stateless, Human Interface Device (HID) terminals, usually in the form of desktop units, that provide access to computation and communication services provided over a network connection.

Each HID (or terminal) provides all the facilities needed for a human to communicate with the computational systems. This typically involves, a framebuffer for displaying information, keyboard and mouse inputs, and may include audio and video input and output, as well as other services. Each HID is normally used as the access point into the networked computing services for one user.

Because the HIDs are stateless (meaning that no important information is available only within the unit), the architecture allows a user's information to be instantly sent to any HID within a network. That is, a user can be in the middle of typing an e-mail message on one HID, and move his or her session to another, for instance by inserting a smart card into the new HID and picking up exactly where they left off. Similarly, if one HID fails, a user can move to another without losing any work.

Also, since the computation services available at an HID are not tied to the specific unit, the user's computational session can be hosted on one of several servers within a server group. Different users can use the same HID to access sessions on different servers. Similarly, a single user can simultaneously have computational sessions on several servers and choose which should be presented at the HID.

Output Environments

Often in a modern computing environment, a user will have many services active at the same time. This often creates problems when the number of services cannot be displayed effectively in a single output terminal. One solution is to use "screen flipping". Screen flipping essentially transforms the user's computing environment into one that is larger than what is displayed on the monitor. The user, then, is shown only a portion of the environment at any one time and the other portion of the environment is not visible. If the user wants to move to a portion of the computer environment that is not visible, for instance to access a computer program displayed there, the user positions a pointer at the edge of the currently displayed environment and essentially pushes the screen in the desired direction.

FIGS. 1–3 show how screen flipping may be implemented. Computer environment 100 of FIG. 1 is divided into four segments, 110–140 respectively. Output device 150 displays the currently visible segment 130. In operation, a user positions pointer 200 of FIG. 2 on a portion of the screen 210 where the user desires to push the environment. The environment is then pushed and the direction the user pushes becomes the currently displayed segment enabling the user to access a computer program displayed in that segment. FIG. 3 shows the result of screen flipping in the direction indicated in FIG. 2. In FIG. 3, segment 140 is shown on display device 150. It should be noted that other tools are available to navigate the multi-headed configuration, including special keys, key combinations, and navigation applications.

Screen flipping is problematic because the user can get lost within the larger computing environment. For instance, since segment 140 is not visible, the user may not know that the needed computer program resides in segment 140.

Multi-Head Configuration

Another method that makes it easier for a user to handle many running computer programs is to display the larger computing environment on more than one output device, termed a "multi-head" configuration. Using the multi-head configuration, a user will operate a computer and have the multiple output devices arranged in such a manner that the entire environment can be displayed on the output devices. One example of such an arrangement is shown in FIG. 4. Computing environment 400 is partitioned into segments 410–430. Segments 410–430 are displayed on output devices 440–460. In this configuration three output devices are used where there is one row of such devices and three columns, but other two dimensional arrangements are equally applicable.

Multi-head Configurations in Modern Computers

One way to allow a modern computer to handle a multi-head configuration is to place multiple framebuffer cards into the computer, one for each display screen in the multi-head configuration, this involves using additional expansion slots or even changing the manufacture of such a computer to have expansion slots. This solution runs contrary to the goals of modern computer architectures. The end user terminals are configured to have as little hardware as possible and be as inexpensive as possible. A solution that makes the end user terminal more complicated and requires additional manufacturing, and hence more expense, is disadvantageous.

SUMMARY OF THE INVENTION

The present invention provides a mechanism for grouping several standard computers, such as HIDs, and making them act as one for the purpose of building a multi-head display. In one embodiment, the servers are augmented to identify the HIDs as either "primary" terminals or "secondaries". A primary terminal is one where a keyboard, mouse or other attachment should be made or one where the user has inserted a smart card or otherwise indicated that service is requested. All other terminals are deemed secondaries.

In one embodiment, a set of policy modules decides whether computational service should be provided to the HID and, if so, what type of service. The policy module is consulted whenever a new HID connects to the network, when the authentication token is changed, when the HID is commanded to connect to a different server, or when the computational service exists. The policy module looks the HID up in a database using a unique identification string from the HID. If the HID is not a secondary terminal within a terminal group (e.g., either a primary terminal or an HID not part of any group), the module takes no action, allowing other policy modules to make their decisions in the usual way.

However, if the HID is a secondary, the module consults all the computational servers within the group to see if the primary terminal of the group presently has an active session connected to any of the servers. If the primary terminal is being controlled by the same server to which the secondary HID is connected, the session connection information for the primary is augmented to indicate that the secondary is attached to the same session, and this information is disseminated to the interested software entities. No separate session is created for the secondary, however, the session associated with the primary terminal may provide output to the secondary.

Alternatively, if the primary terminal is being controlled by another server in the group, the HID is commanded to re-attach to the same server that is hosting the primary terminal. Finally, if the primary terminal is not attached to any server, a special session is presented that consists of an icon indicating that the secondary is waiting to find the primary. The process implementing this session continually queries to see if the primary has attached to any of the servers in the group. If so, the session exits, restarting the authentication process.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention provides a mechanism for grouping several standard HIDs that can make them act as one for the purpose of building a multi-head display. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

One example of a modern computer architecture is described below. This architecture provides one example of an environment where the competing problems exist of forming a multi-head arrangement and having a stripped down end-user terminal.

Virtual Desktop System Architecture

Figure 1:
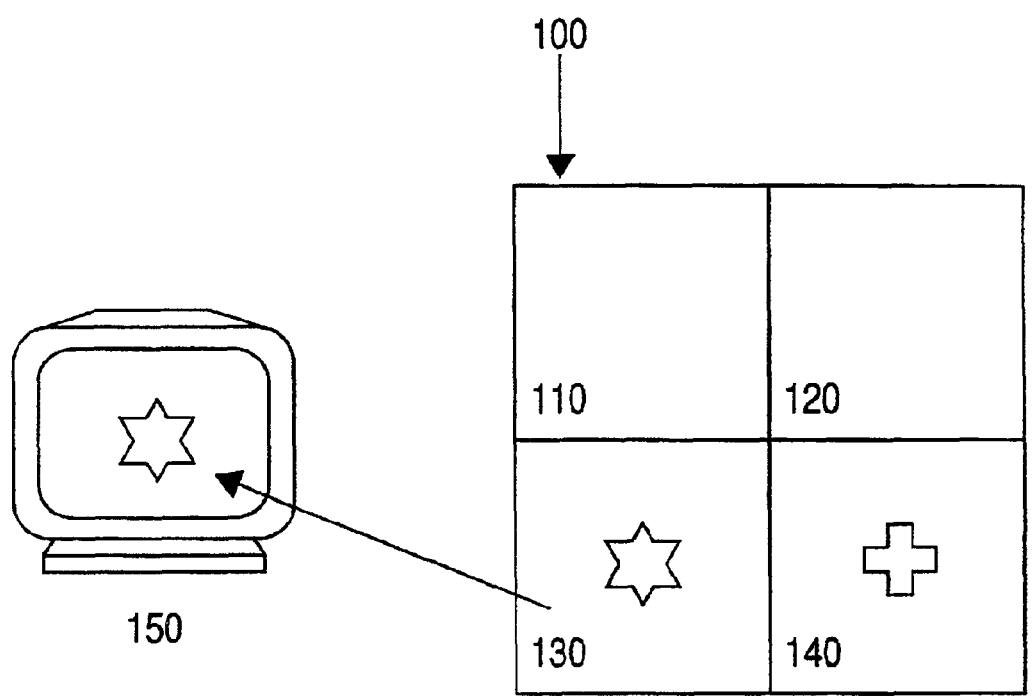
FIG. 1 is an example of screen flipping.
Figure 2:
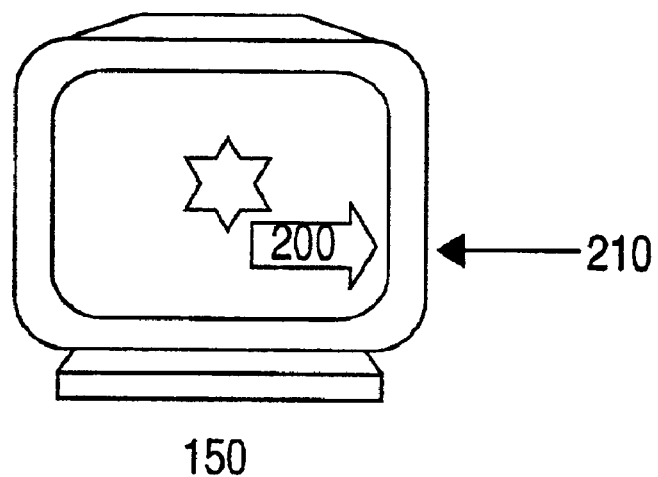
FIG. 2 is an example of screen flipping.
Figure 3:
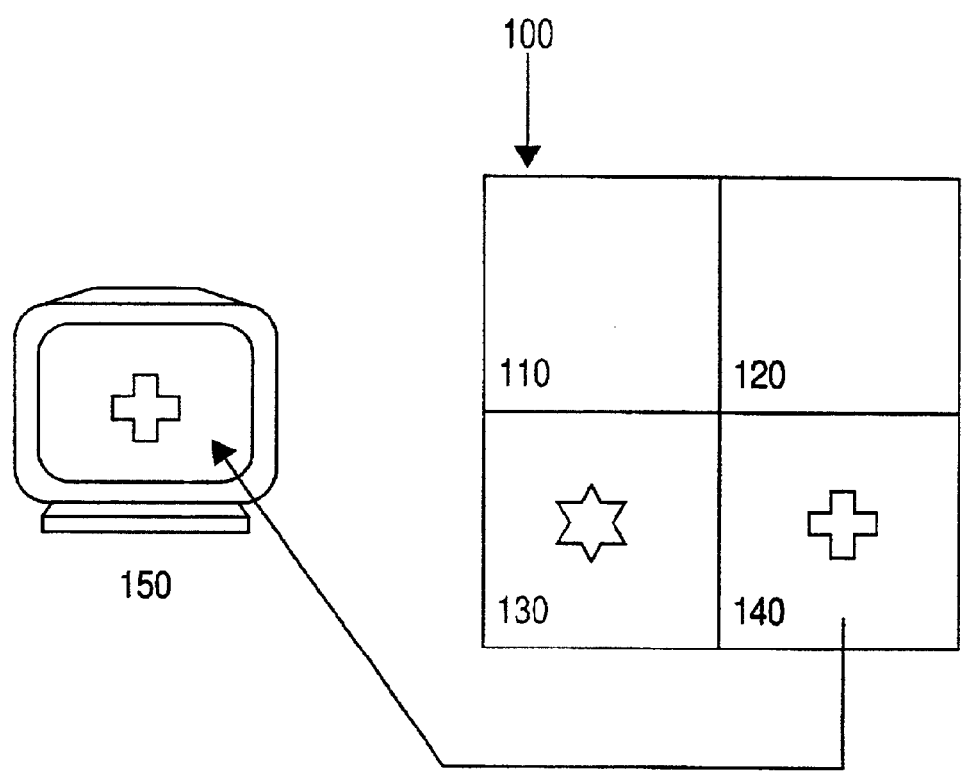
FIG. 3 is an example of screen flipping.
Figure 4:
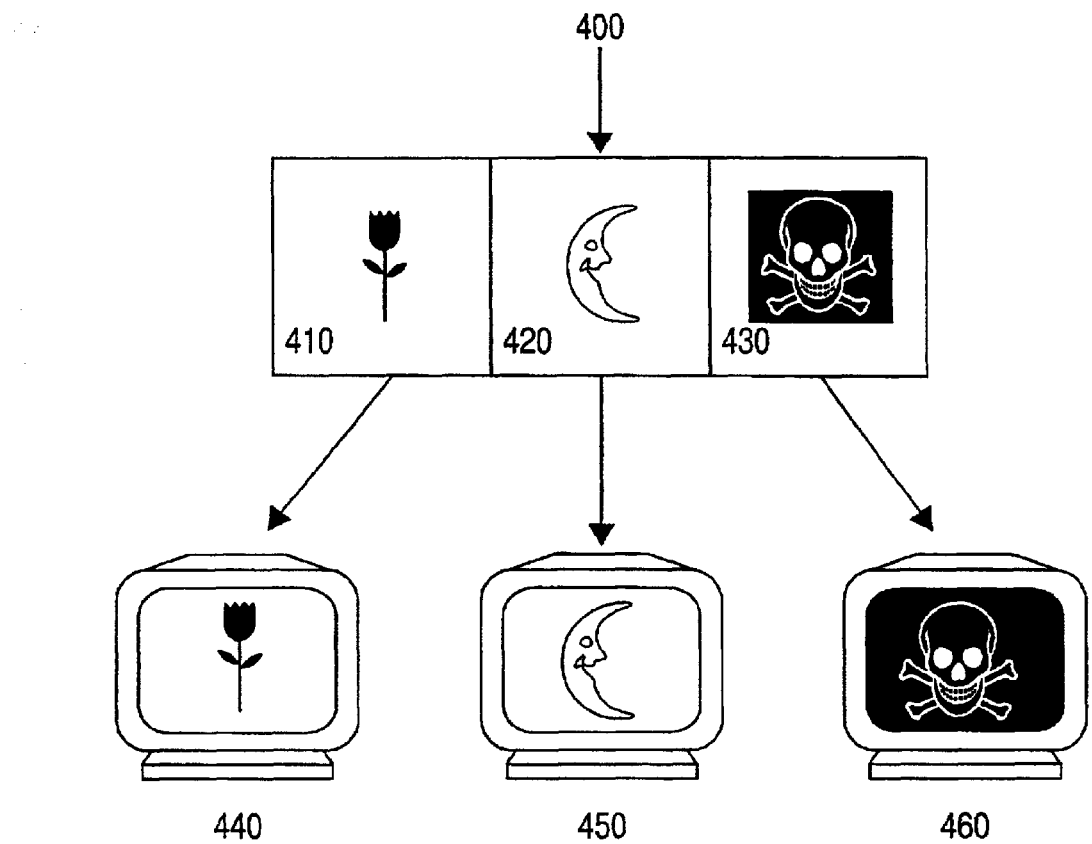
FIG. 4 is an example of a multi-head configuration.
Figure 5:
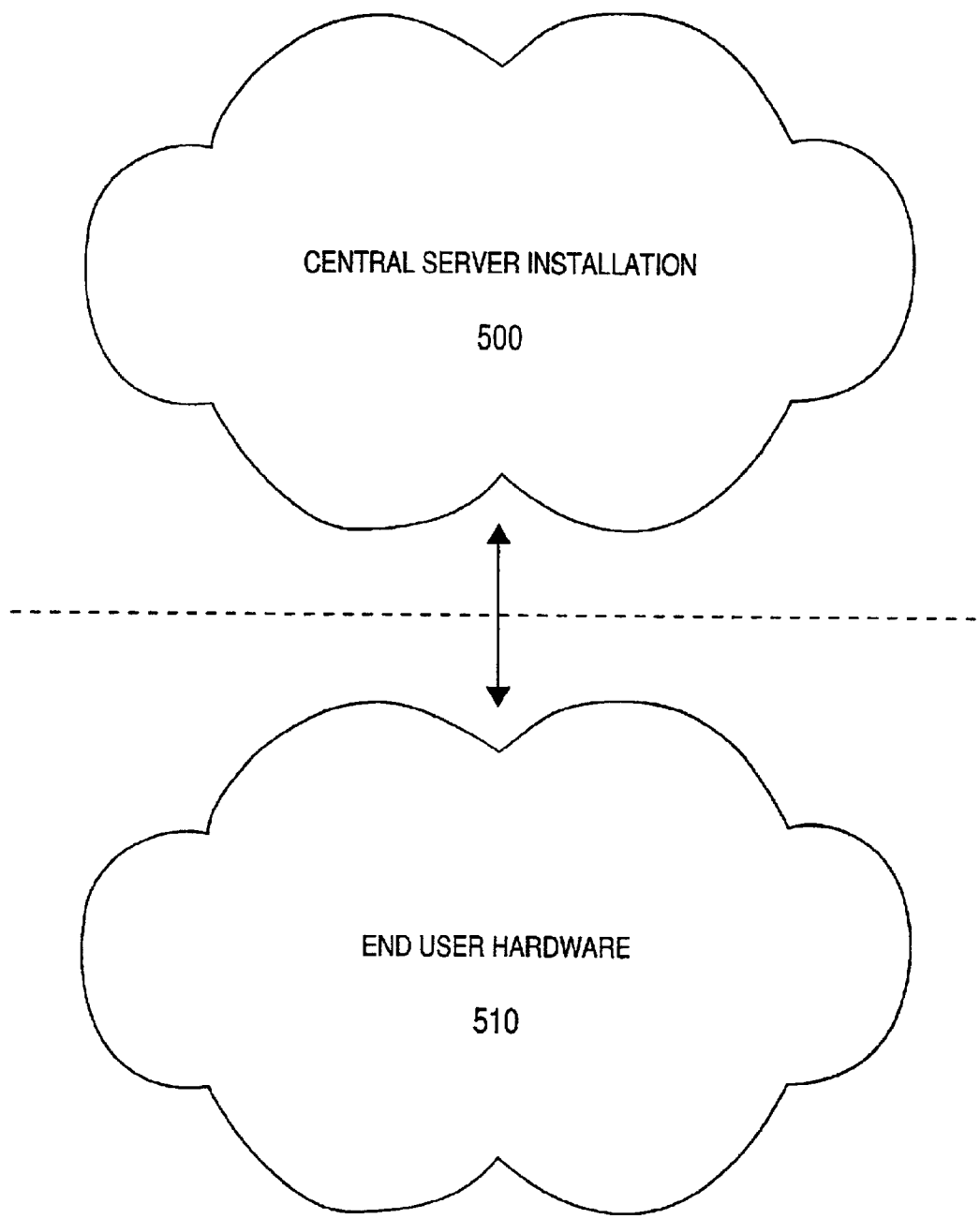
FIG. 5 shows an example of a thin client topology called a virtual desktop system architecture.

FIG. 5 shows an example of a thin client topology called a virtual desktop system architecture. The virtual desktop system architecture provides a re-partitioning of functionality between a central server installation 500 and end user hardware 510. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 6:
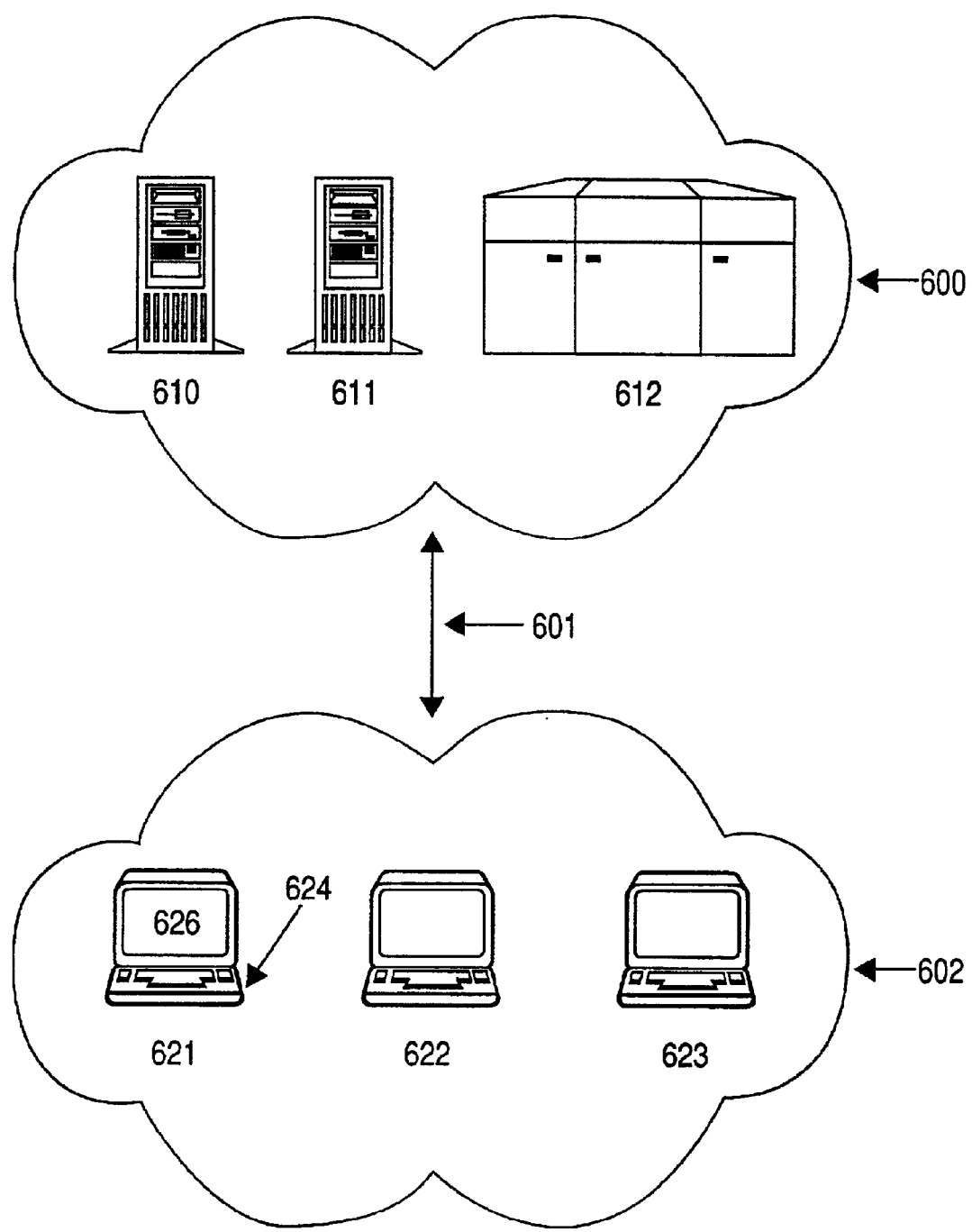
FIG. 6 displays the partitioning of the functionality of the virtual desktop system architecture.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 6, wherein the system comprises computational service providers 600 communicating data through communication link 601 to HIDs 602.

The computational power and state maintenance is provided by the service providers or services. The services are not tied to a specific computer, but may be distributed over one or more traditional desktop systems such as described in connection with FIG. 6, or with traditional servers. One computer may have one or more services, or a service maybe implemented by one or more computers. The service provides computation, state and data to HIDs and the service is under the control of a common authority or manager. In FIG. 6, the services are provided by computers 610, 611, and 612. In addition to the services, a central data source can provide data to the HIDs from an external source such as for example the Internet or world wide web. The data source can also broadcast entities such as those that broadcast data such as television and radio signals.

Examples of services include X11/Unix services, archived or live audio or video services, Windows NT service, Java program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sun MediaCenter could be used to provider video service, a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network with cooperative (as opposed to completing) network traffic. Dedicated or shared communications interconnects may be used in the present invention.

The HID is the means by which users access the computational services provided by the services. FIG. 6 illustrates HIDs 621, 622 and 623. Each HID comprises a display 626, a keyboard 624, mouse (not shown), and audio speakers (not shown). The HID includes the electronics need to interface these devices to the interconnection fabric and to transmit to and receive data from the services.

Figure 7:
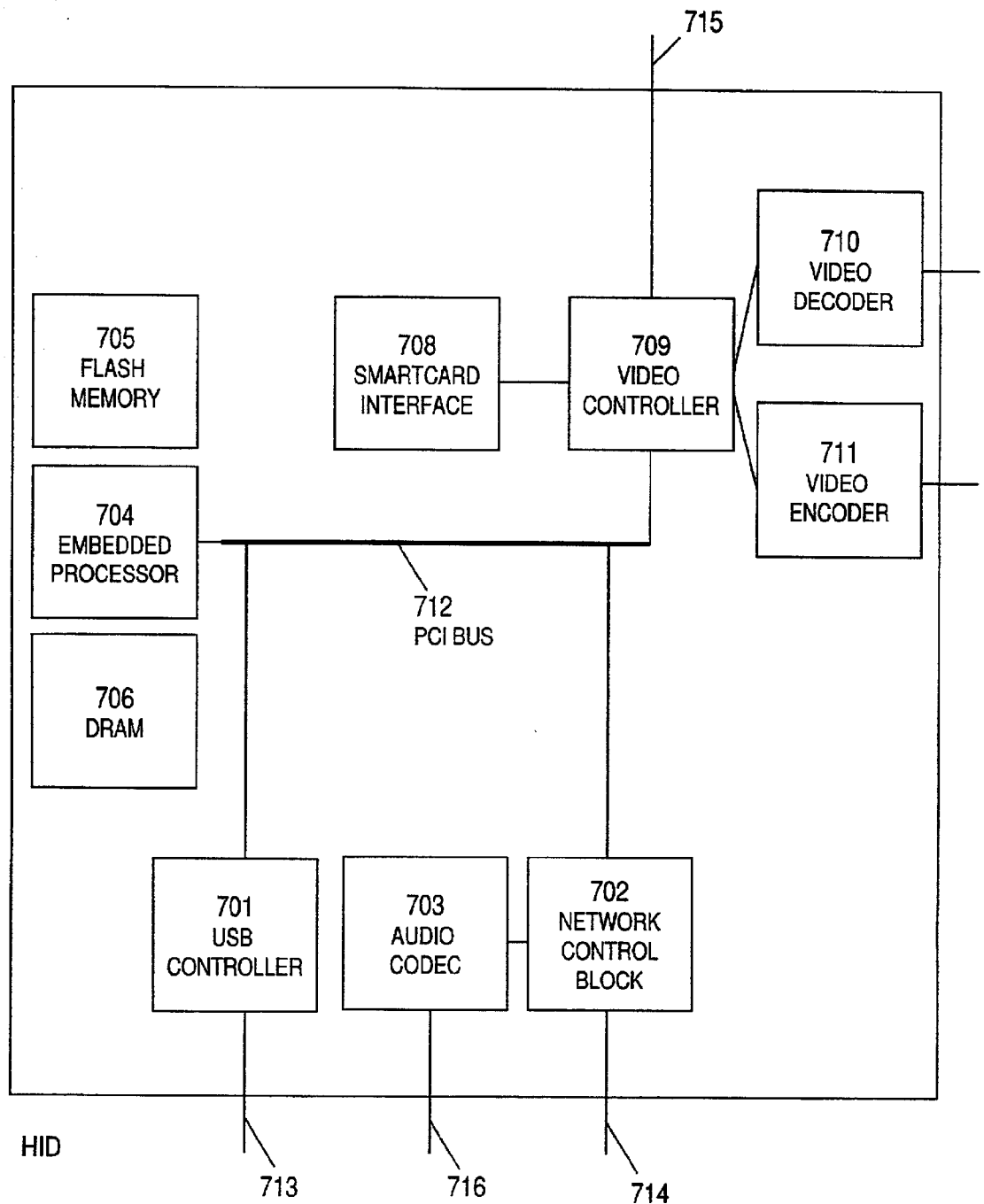
FIG. 7 is a block diagram of an example embodiment of a human interface device.

A block diagram of an example embodiment of the HID is illustrated in FIG. 7. The components of the HID are coupled internally to a PCI bus 712. A network control block 702 communicates to the interconnect fabric, such as an Ethernet, through line 714. An audio code 703 receives audio data on interface 716 and is coupled to block 702. USB data communication is provided on lines 713 to a USB controller 701. The HID further comprises a embedded processor 704 such as a Sparc2ep with coupled flash memory 705 and DRAM 706. The USB controller 701, the network controller 702 and the embedded processor 704 are all coupled to the PCI bus 712. A video controller 709, also coupled to the PCI bus 712, can include an ATI RagePro+ frame buffer controller which provides SVGA output on the line 715. NTSC data is provided in and out of the video controller through video decoder 710 and encoder 711 respectively. A smartcard interface 708 may also be coupled to the video controller 709.

Figure 8:
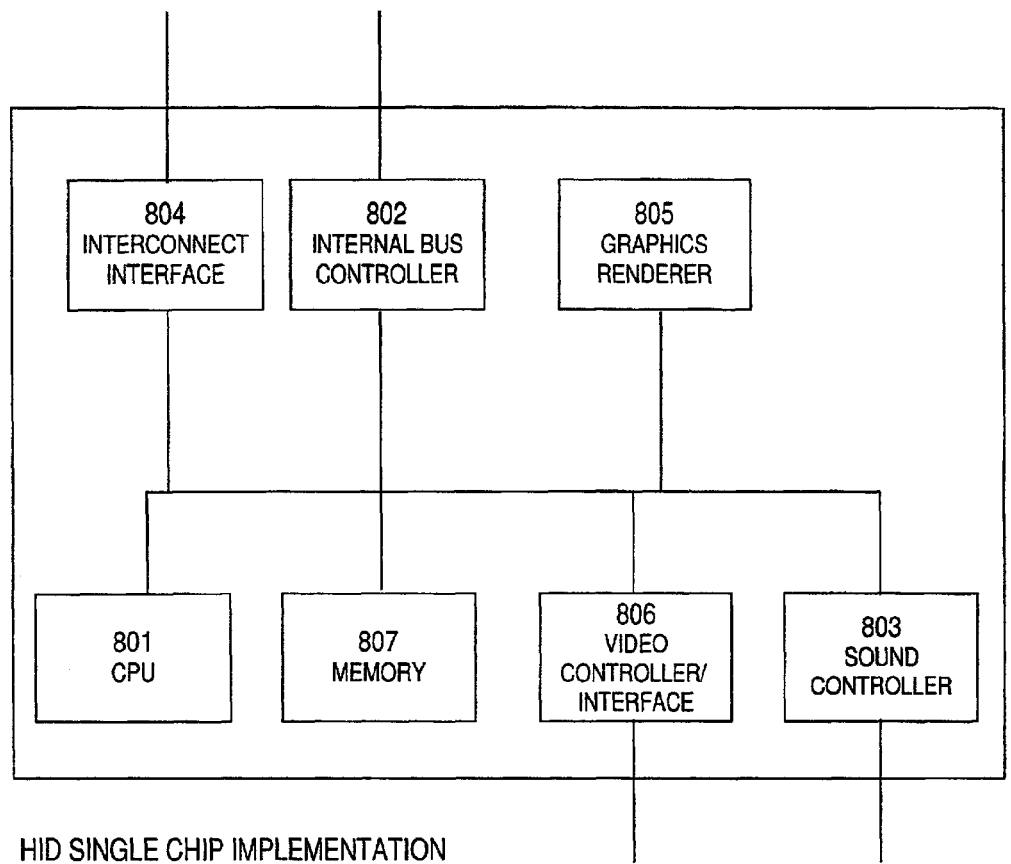
FIG. 8 is a block diagram of a single chip implementation of a human interface device.

Alternatively, the HID can comprise a single chip implementation as illustrated in FIG. 8. The single chip includes the necessary processing capability implemented via CPU 801 and graphics renderer 805. Chip memory 807 is provided, along with video controller/interface 806. A internal bus (USB) controller 802 is provided to permit communication to a mouse, keyboard and other local devices attached to the HID. A sound controller 803 and interconnect interface 804 are also provided. The video interface shares memory 807 with the CPU 801 and graphics renderer 805. The software used in this embodiment may reside locally in on-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference.

Authentication and Session Managers

Within the virtual desktop system architecture (and others), an Authentication Manager is responsible for receiving information from the HIDs, including the status of any identification token presented by the user (e.g., a smart card). The Authentication Manager determines if the user is to be allowed to access a computational service, and if so determines the computational server that should provide the service. In addition, it can select one of a set of session types that will be presented at the HID. For example, a user that provided a smart card at the HID may be allowed to access more services than one that did not.

A Session Manager is also provided within the architecture. The Session Manager is responsible for communicating decisions of the Authentication Manager to all interested software entities within the system. The entities, or computational services, register with the Session Manager to receive information on the computational session for which they provide service.

In one embodiment of the present invention the Authentication Manager is augmented to allow the specification of "terminal groups", (i.e. a group of HIDs that should be treated as if they were a single unit). A specific unit can be identified as the one to which the keyboard, mouse, and other attachments should be made. Such an HID is called the primary terminal. All others within a group are called secondaries. If identification tokens are being used (e.g., smart cards), they would similarly be presented only at the primary terminal.

Policy Modules

Within the Authentication Manager, the policy for what should be done for each HID connection is made by a set of policy modules. The policy modules decide whether computational service should be provided to the HID and, if so, what type of service. The policy modules can base this decision on the authentication token provided (e.g., smart card), if any, the particular HID used; whether a server already has a session for the token or HID, as well as other factors.

Figure 9:
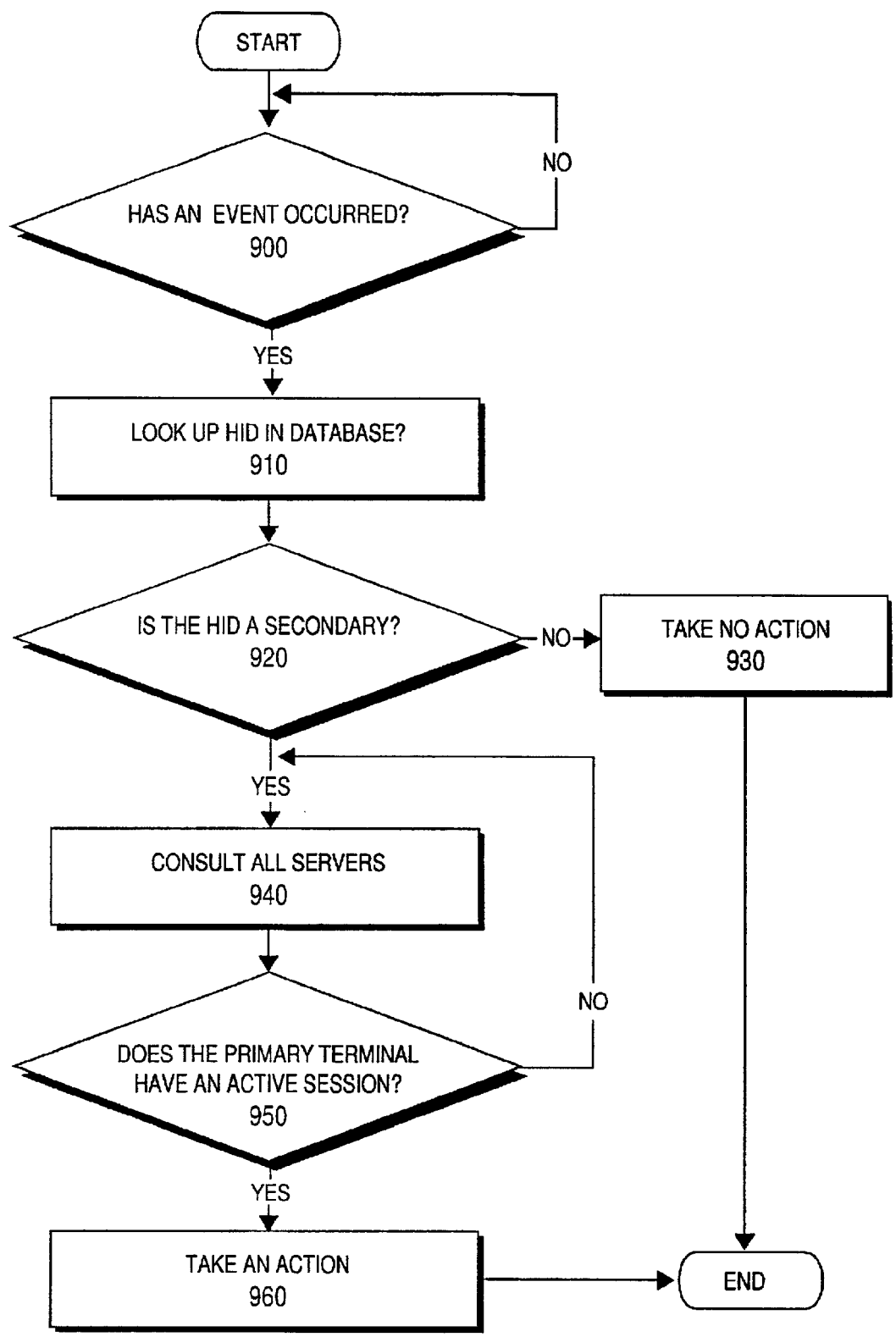
FIG. 9 is a flow chart of an embodiment of the present invention.

One embodiment of the invention provides a new terminal group policy module that facilitates the creation of multi-head displays in a computer architecture. The terminal group policy is consulted whenever a new HID connects to the network or when the authentication token is changed, the HID is commanded to connect to a different server, or the computational service exists. One embodiment of the present invention that includes terminal group policy module is shown in FIG. 9.

At step 900, it is determined whether an event has occurred. An event may comprise a new HID attempting to connect to the network, when an authentication token is changed, or when an HID is commanded to connect to a different server, for instance. If no event has occurred, the process continues to wait until one does. When the event occurs, the terminal group policy module looks the HID up in a database, for instance using a unique identification string from the HID (e.g., a serial number) at step 910.

At step 920, if the HID is not a secondary terminal within a terminal group (e.g., either a primary terminal or a HID not part of any group), the terminal group module takes no action (step 930), allowing other policy modules to make their decisions in the usual way. However, if the HID is a secondary, the terminal group module consults all the computational servers within the group at step 940 to see if the primary terminal of the group presently has an active session connected to any of the servers at step 950.

If the primary terminal of the group presently has an active session connected to any of the servers, some action is taken at step 960. Otherwise, the process waits until the primary terminal activates a session on one of the servers by repeating at step 940.

Figure 10A:
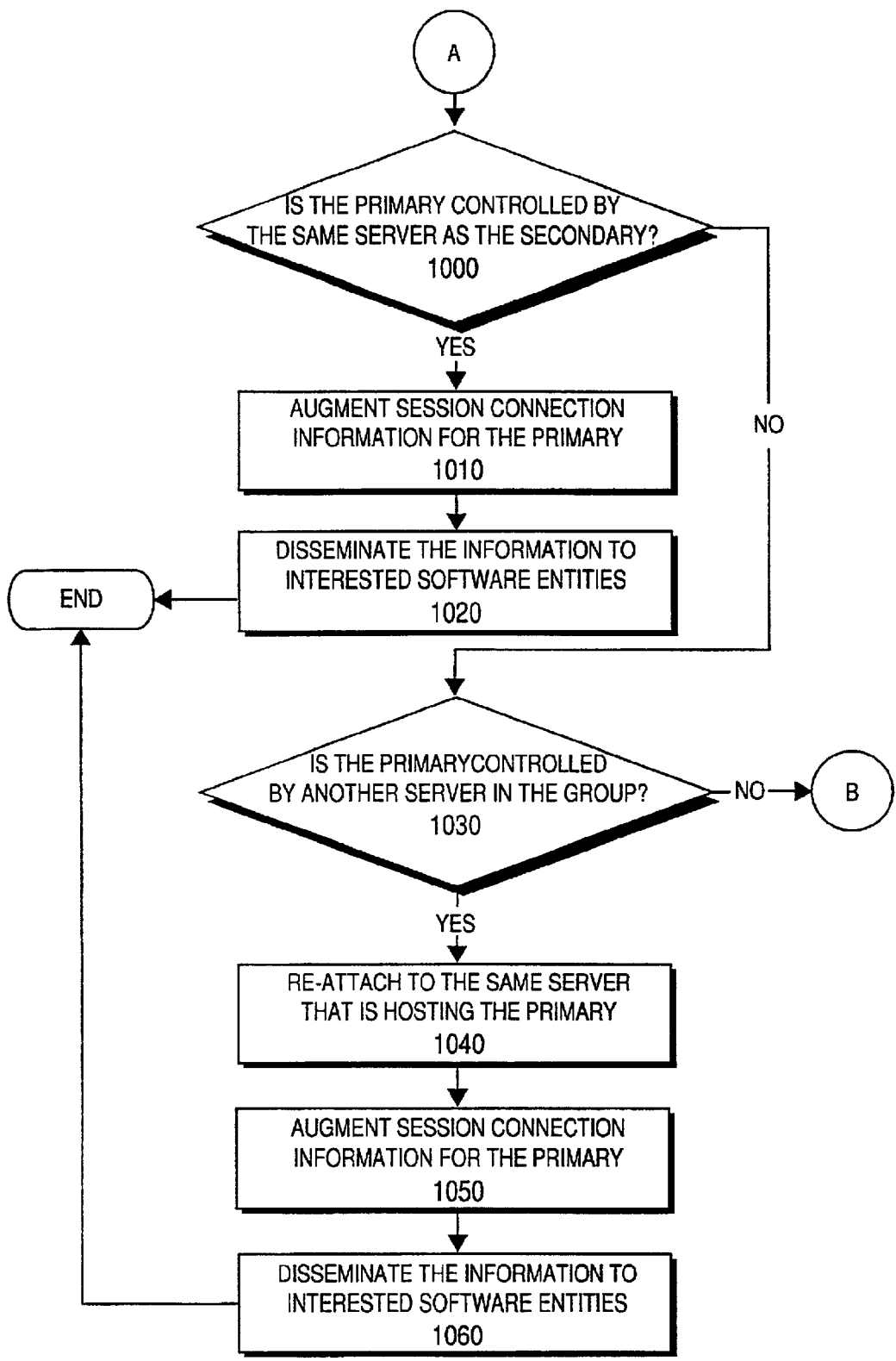
FIGS. 10a and 10b are flow charts of another embodiment of the present invention.
Figure 10B:
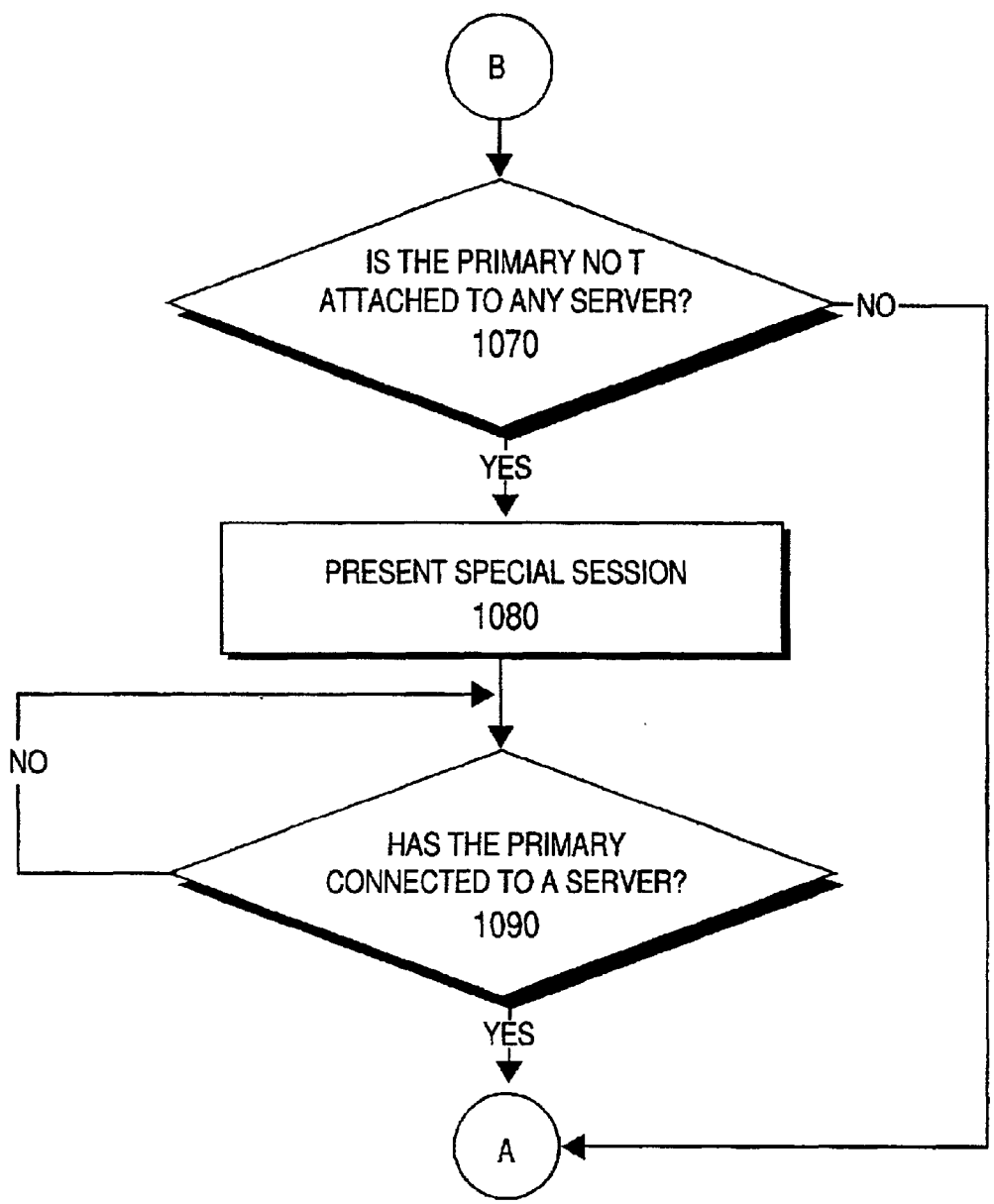

The actions that the terminal group module will take depend on the circumstances of the connection between the primary terminal and the server. FIGS. 10a and 10b show the actions the terminal group module will take in different situations. At step 1000 it is determined whether the primary terminal is being controlled by the same server to which the secondary HID is connected. If it is, the session connection information for the primary is augmented at step 1010 to indicate that the secondary is attached to the same session, and this information is disseminated to the interested software entities (typically via a Session Manager) at step 1020. No separate session is created for the secondary; however, the session associated with the primary terminal may provide output to the secondary. Normally, this involves using the secondary as another display in a multi-head configuration.

If the primary terminal is not being controlled by the same server to which the secondary HID is connected at step 1000, it is determined whether the primary terminal is being controlled by another server in the group at step 1030. If it is, the HID is commanded to re-attach to the same server that is hosting the primary terminal at step 1040. The session connection information for the primary is augmented at step 1050 to indicate that the secondary is attached to the same session, and this information is disseminated to the interested software entities (typically via a Session Manager) at step 1060.

If the primary terminal is not being controlled by another server in the group at step 1030, then at step 1070 it is determined if the primary terminal is not attached to any server. If not, a special session is presented at step 1080 that consists of an icon indicating that the secondary is waiting to find the primary. The process implementing this session continually consults the Authentication Manager at step 1090 to see if the primary has attached to any of the servers in the group. If so, the session exits, restarting the authentication process at step 1000.

Thus, if a secondary connects to server A and initially discovers that the primary has not connected anywhere yet, and then later discovers that the primary has connected to server B it could go through steps 1080 and 1090 and then reverts to step 1000 on server A, and then steps 1010 and 1020 when it connects to server B.

In one embodiment, the Authentication Manager is augmented to perform a database lookup for each terminal to see if it is a primary. If so it determines the number of secondaries that it should expect. In one embodiment of the present invention, the database lookup also includes information on the geographical layout of the screens which the Authentication Manager sends to interested software entities (via the Session Manager). Once one or more secondaries are attached to the primary, all connection, disconnection, redirection, commands that would normally be applied to the primary terminal are also applied to all of the secondaries. For example, if the user removes the identification token from the primary terminal, the session connection will be severed from all secondaries as well. Similarly, if the user chooses to attach to a session on a different server in the group, all terminals (the primary and all secondaries) will be commanded to attach to the other server.

The Authentication Manager's Group Manager module is also augmented to make queries on all other servers within the server group to find out if the primary for a given secondary is currently connected to any of the servers. In one embodiment, a terminal query message is sent to each server in the group identifying the primary terminal by its unique identifier string (e.g., serial number), and each server responds with a terminal reply message indicating whether the server is currently hosting the primary terminal.

Computer Execution Environment

Figure 11:
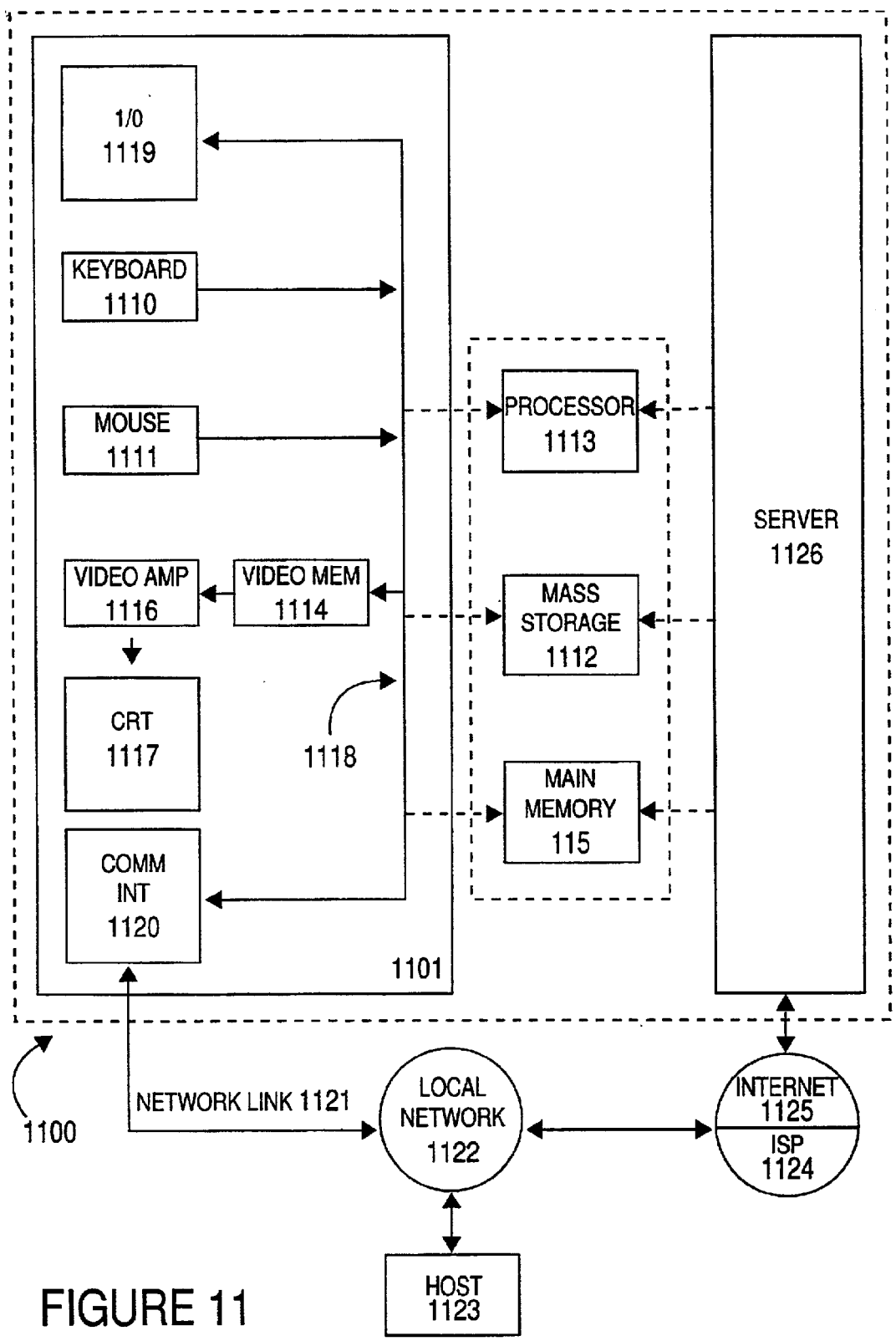
FIG. 11 is an embodiment of a computer execution environment suitable for the present invention.

An embodiment of the invention can be implemented as computer software in the form of computer readable program code executed in a general purpose computing environment such as environment 1100 illustrated in FIG. 11, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1110 and mouse 1111 are coupled to a system bus 1118. The keyboard and mouse are for introducing user input to the computer system and communicating that user input to central processing unit (CPU) 1113. Other suitable input devices maybe used in addition to, or in place of, the mouse 1111 and keyboard 1110. I/O (input/output) unit 1119 coupled to bi-directional system bus 1118 represents such I/O elements as a printer, A/V (audio/video) I/O, etc.

Computer 1101 may include a communication interface 1120 coupled to bus 1118. Communication interface 1120 provides a two-way data communication coupling via a network link 1121 to a local network 1122. For example, if communication interface 1120 is an integrated services digital network (ISDN card or a modem, communication interface 1120 provides a data communication connection to the corresponding type of telephone line, which comprises part of network link 1121. If communication interface 1120 is a local area network (LAN) card, communication interface 1120 provides a data communication connection via network link 1121 to a compatible LAN. Wireless links are also possible. In any such implementation, communication interface 1120 sends and receives electrical, electromagnetic or optical signals which carry digital data streams representing various types of information.

Network link 1121 typically provides data communication through one or more networks to other data devices. For example, network link 1121 may provide a connection through local network 1122 to local server computer 1123 or to data equipment operated by ISP 1124. ISP 1124 in turn provides data communication services through a world wide packet data communication network, such as the Internet 1125. Local network 1122 and Internet 1125 both use electrical, electromagnetic or optical signals which carry digital data streams. The signals through the various networks and the signals on network link 1121 and through communication interface 1120, which carry the digital data to and from computer 1100, are exemplary forms of carrier waves transporting the information.

Processor 1113 may reside wholly on client computer 1101 or wholly on server 1126 or processor 1113 may have its computational power distributed between computer 1101 and server 1126. Server 1126 symbolically is represented in FIG. 11 as one unit, but server 1126 can also be distributed between multiple "tiers". In one embodiment, server 1126 comprises a middle and back tier where application logic executes in the middle tier and persistent data is obtained in the back tier. In the case where processor 1113 resides wholly on server 1126, the results of the computations performed by processor 1113 are transmitted to computer 1101 via Internet 1125, Internet Service Provider (ISP) 1124, local network 1122 and communication interface 1120. In this way, computer 1101 is able to display the results of the computation to a user in the form of output.

Computer 1101 includes a video memory 1114, main memory 1115 and mass storage 1112, all coupled to bi-directional system bus 1118 along with keyboard 1110, mouse 1111 and processor 1113. As with processor 1113, in various computing environments, main memory 1115 and mass storage 1112, can reside wholly on server 1126 or computer 1101, or they may be distributed between the two. Examples of systems where processor 1113, main memory 1115, and mass storage 1112 are distributed between computer 1101 and server 1126 include the thin-client computing architecture, in architectures where PDAs are used, in Internet enabled cellular phones and other Internet computing devices, and in platform independent computing environments, such as those which utilize the Java technologies.

The mass storage 1112 may include both fixed and removable media, such as magnetic, optical or magnetic optical storage systems or any other available mass storage technology. Bus 1118 may contain, for example, thirty-two address lines for addressing video memory 1114 or main memory 1115. The system bus 1118 also includes, for example, a 32-bit data bus for transferring data between and among the components, such as processor 1113, main memory 1115, video memory 1114 and mass storage 1112. Alternatively, multiplex data/address lines maybe used instead of separate data and address lines.

In one embodiment of the invention, the processor 1113 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the cathode ray tube (CRT) raster monitor 1117. Video amplifier 1116 is well known in the art and may be implemented by any suitable apparatus. This circuitry converts pixel data stored in video memory 1114 to a raster signal suitable for use by monitor 1117. Monitor 1117 is a type of monitor suitable for displaying graphic images.

Computer 1101 can send messages and receive data, including program code, through the network(s), network link 1121, and communication interface 1120. In the Internet example, remote server computer 1126 might transmit a requested code for an application program through Internet 1125, ISP 1124, local network 1122 and communication interface 1120. The received code maybe executed by processor 1113 as it is received, and/or stored in mass storage 1112, or other non-volatile storage for later execution. In this manner, computer 1100 may obtain application code in the form of a carrier wave. Alternatively, remote server computer 1126 may execute applications using processor 1113, and utilize mass storage 1112, and/or video memory 1115. The results of the execution at server 1126 are then transmitted through Internet 1125, ISP 1124, local network 1122 and communication interface 1120. In this example, computer 1101 performs only input and output functions.

Application code may be embodied in any form of computer program product. A computer program product comprises a medium configured to store or transport computer readable code, or in which computer readable code maybe embedded. Some examples of computer program products are CD-ROM disks, ROM cards, floppy disks, magnetic tapes, computer hard drives, servers on a network, and carrier waves.

The computer systems described above are for purposes of example only. An embodiment of the invention maybe implemented in any type of computer system or programming or processing environment.

Thus, associating multiple display units in a grouped server environment is described in conjunction with one or more specific embodiments. The invention is defined by the claims and their full scope of equivalents.

What is claimed is:

1. A method for associating multiple display units in a grouped server environment including a number of grouped server computer systems, the method comprising:

identifying when a secondary Human Interface Device is connected with a first server computer system;

determining whether a primary Human Interface Device associated with said secondary Human Interface Device is displaying a first part of an associated active session;

performing a first action, if said primary Human Interface Device is displaying said first part of said associated active session; and displaying a second part of said associated active session on said secondary Human Interface Device;

wherein said first part of said associated active session is different from said second part of said associated active session; and wherein said first action comprises:
- determining a second server computer system for providing said first associated active session;
- determining whether said first and second server computer systems are the same server computer system; and
- redirecting said connection of said secondary Human Interface Device to said second server computer system, if said first and second server computer systems are not the same server computer system.

2. The method of claim 1, further comprising:

augmenting said associated active session to indicate that said first and second server computer systems are the same server computer system.

3. The method of claim 1, further comprising:

performing a second action, if said primary Human Interface Device does not have said associated active session.

4. The method of claim 3, wherein said second action comprises:

performing a special session for said secondary Human Interface Device.

5. The method of claim 4, wherein said special session comprises:

indicating on said secondary Human Interface Device that said secondary Human Interface Device is waiting to find said primary Human Interface Device.

6. The method of claim 5, wherein said special session further comprises:

- determining whether said primary Human Interface Device is displaying said first part of said associated active session after performance of said special session; and
- exiting said special session, if said primary Human Interface Device is displaying said first part of said associated active session.

7. The method of claim 6, wherein said special session further comprises:

performing the steps in said first action, if said primary Human Interface Device is displaying said first part of said associated active session.

8. The method of claim 7, wherein said special session further comprises:

repeating the steps in said special session until said primary Human Interface Device is displaying said first part of said associated active session.

9. The method of claim 1, wherein said primary and secondary Human Interface Devices are associated to simulate a multi-head display unit.

10. The method of claim 1, wherein the steps of the method are performed by a computer-readable code.

11. The method of claim 1, wherein said primary Human Interface Device provides a network interface to a user and wherein said second server computer system provides a plurality of computational services removed from said primary Human Interface Device to said user.

12. The method of claim 11, wherein said plurality of computational services comprise a computational power for said primary Human Interface Devices and a state maintenance for said primary Human Interface Devices.

13. The method of claim 1, wherein said primary and secondary Human Interface Devices are stateless devices.

14. The method of claim 1, wherein each of said primary and secondary Human Interface Devices comprises only a single framebuffer card for display.

15. The method of claim 1, wherein said associated active session displays a large computing environment as separate parts.

16. The method of claim 1, further comprising:

applying commands from the second server computer system to both the primary Human Interface Device and the secondary Human Interface Device.

17. The method of claim 16, wherein the commands include connection commands, disconnection commands, or redirection commands.

18. A method for associating multiple display units of a display terminal group, wherein the multiple display units of the display terminal group are capable of being controlled by a number of server computer systems in a computational server group, comprising:

- identifying an event occurrence wherein a secondary display unit within the display terminal group connects to a server computer system in the computational server group, the display terminal group including one primary display unit and one or more secondary display units;
- in response to identifying the event occurrence, determining whether the primary display unit in the display terminal group has an active session connected to a server computer system in the computational server group; and
- if the primary display unit in the display terminal group does have an active session connected,
  - determining if the server computer system connected to the secondary display unit is different from the server computer system connected to the primary display unit, and
  - if the server computer systems connected to the secondary and primary display units are determined to be different, reconnecting the secondary display unit to the server computer system to which the primary display unit is connected, the reconnecting causing the secondary display unit to share the active session connected with the primary display unit.

* * * * *